2,837,439
PAPER SIZE

Judson S. Swearingen and Lubertus Bakker, San Antonio, Tex., assignors, by mesne assignments, to Sinclair Refining Company, New York, N. Y., a corporation of Maine No Drawing. Application October 27, 1953
Serial No. 388,688

4 Claims. (Cl. 106—238)

Our invention relates to the manufacture of novel compositions useful as sizing materials for paper.

The permeability of paper to liquids is a very important property and various materials are used to "size" or treat paper products to produce a desired permeability. For example, writing paper must be sized so that ink does not spread on the paper. The sizing material may also provide an adhesive between the fibers of the paper thus increasing its strength. The sizing agent may be applied by mixing with the pulp from which the paper is to be formed or may be applied to the already formed paper. One of the most widely used sizing agents is prepared from rosin. Rosin size is prepared by the saponification of rosin with sodium carbonate or sodium hydroxide to yield a thick paste. In use, the paste is diluted with hot water and this solution is added to the stock either before or simultaneously with aluminum sulfate (papermaker's alum) which precipitates the rosin on the fibers on the paper as very small particles. The size acts as a good bonding material but is somewhat brittle. Numerous attempts have been made to prepare paper sizing material from hydrocarbon materials such as paraffin because it is an excellent water-proofing material. However, a paraffin type sizing material is a good lubricant and does not satisfactorily bond the fibers together. Moreover, it is a crystalline material and thus does not satisfactorily spread over the fibers unless used in excessive amounts.

We have now found that aqueous emulsions of partially saponified rosin and aromatic petroleum lubricating oil extracts of particular characteristics in which a particular amount of free rosin is present provide excellent paper sizing compositions which reduce the permeability of the paper to liquids and effectively bind the paper fibers. The emulsions are characterized by the presence of at least about 0.4 part of saponified rosin per part of aromatic extract, by the presence of about 5 to 8.5 weight percent of free rosin based on the original rosin present and by the use of aromatic extracts of particular physical characteristics such as aromaticity, molecular weight, viscosity, gravity and flash point. The emulsions are uniform and of good stability. Advantageously, they can be produced in concentrated form thus avoiding the shipment of large quantities of water and permitting the user to dilute the concentrate prior to use. The emulsions provide substantial economic advantage in that expensive rosin can be partially replaced with a petroleum product that is readily available and relatively inexpensive without sacrificing sizing efficiency.

The aromatic petroleum extracts of our compositions are extracts from the solvent refining, for example, with phenol, furfural, or other commercial solvents, of lubricating oil stocks. We have found that the aromaticity of the extract oil is critical in terms of the emulsifiability of the oil and sizing efficiency of the resulting compositions. The oil must have an aromaticity in terms of aniline point of not more than about 60° C. to be satisfactorily emulsifiable and to produce compositions of good sizing efficiency. For particularly advantageous emulsions of optimum sizing efficiency, the oil should have about 1.5 to 3 aromatic rings per molecule. For the preparation of emulsions of satisfactory stability and sizing efficiency, the extract oil should have an API gravity of about 6.0 to 16.0, a flash point of not less than about 375° F., a viscosity in SUS of between about 400 to 35,000 at 100° F. and between about 50 to 300 at 210° F., and a molecular weight of about 250 to 500.

By the term rosin, we mean the term as conventionally applied to the resins obtained as a residue after distillation of turpentine oil from crude turpentine. For some applications, the rosin component may be replaced with petroleum derived acids such as petroleum sulfonic acids, wax acids or naphthenic acids to produce sizing compositions consisting entirely of petroleum materials. We have found that the proportion of saponified rosin to oil in the emulsion must be at least about 0.4 to 1 for the production of emulsions of satisfactory stability and sizing efficiency. Proportions of as high as 3 parts of rosin per part of oil may be used. Proportions of about 1 to 3 parts of rosin per part of oil are particularly advantageous. We have also found that the presence of free rosin in an amount of about 5 to 8.5 weight percent based on the original rosin present is required for emulsions of satisfactory stability and sizing efficiency. Complete saponification of the rosin impairs the stability and efficiency of the emulsions. The presence of about 5.0 to 8.5 percent of free rosin in the emulsion corresponds to a pH of about 9.5 to 10.5 measured in a one percent dilute solution which provides an advantageous method of measuring this critical characteristic. An amount of about 6.5 to 8.5 percent which corresponds to a pH of about 9.5 to 9.8 produces a particularly advantageous emulsion.

The compositions are prepared by reacting an alkali, such as sodium hydroxide or sodium carbonate, with rosin in the presence of a petroleum lubricating oil extract at an elevated temperature, for example, about 90 to 95° C., while agitating the mixture to disperse the oil. Water may be added after the reaction but a more advantageous method is to first heat the rosin and oil and then add sodium hydroxide in a solution of the desired amount of water, for example, in an amount equal to the rosin and oil of a 50 percent solids concentration if this is the desired concentration. This method avoids the difficulties encountered by precipitation of rosin which sometimes occurs in the method in which water is added separately. The alkali, e. g. sodium hydroxide, is added in an amount sufficient to neutralize most of the rosin but to leave about 5 to 8.5 percent of free rosin. Air is easily entrained during the agitation of the reactants and the agitation should be carried out in such a manner that this is avoided as it appears to impair the stability of the emulsion. Emulsions containing up to about 90 percent concentration of solids, i. e. sodium rosinate and oil, can thus be prepared. It is desirable, however, to limit the solids concentration to not over about 70 percent because of difficulties encountered in dispersion of the size in water. In paper manufacture the size must be rapidly dispersed in water and the high solids content sizes require more time for dispersion. As the solids content is increased it is desirable to increase the free rosin content. The emulsions may be further diluted and used for paper sizing by the conventional procedure using aluminum sulfate.

In use, the compositions are treated with aluminum sulfate to precipitate the rosin on the paper fibers and at the same time the aromatic extract is incorporated into the paper in which it acts as a bonding agent for the fibers and as a waterproofing material. If desired, in certain applications such as the manufacture of paper towels, addition of a wetting agent to the compositions may be advantageous to backwet the towel to make it properly absorbent.

The preparation and properties of the compositions will be further illustrated by reference to the following examples.

In the examples, the rosin used was a pure grade rosin with an acid number of 171. The water used had a calcium hardness of 250 p. p. m. Aromatic petroleum extracts of varying characteristics, especially aromaticity, were used. Aromatic extract A had an aniline point of below —6° C., an API gravity of 6.8, a flash point of 415° F., a viscosity in SUS of 3600 at 100° F. and 75.6 at 210° F., and a molecular weight of 322. Extract B had an aniline point of 57.7° C., an API gravity of 16.0, a flash point of 435° F., a viscosity in SUS of 1,467 at 100° F. and 75.1 at 210° F., and a molecular weight of 404. Extract C had an aniline point of 65.4° C., an API gravity of 15.1, a flash point of 520° F., a viscosity in SUS of 8,400 at 100° F. and 197.5 at 210° F. and a molecular weight of 521.

Example I

Compositions of varying proportions of saponified rosin and aromatic extracts in water were prepared and observed for emulsion formation and stability.

The procedure used in the preparation of the compositions consisted of melting the rosin together with the aromatic extract and adding sufficient sodium hydroxide to neutralize substantially all, e. g. about 93 to 95 percent, of the free acid in the rosin. The hot mixture was subsequently diluted with water to form a 50 percent solids emulsion. In the example, sodium hydroxide was added to the hot mixture at a temperature of about 90 to 95° C. and stirred for 20 to 30 minutes. An equal amount of water at 90° C. was added and stirring continued until no solid material remained. The mixture was then cooled to 60° C. with stirring.

Compositions containing 0.25, 0.4 and 0.66 part of saponified rosin per part of aromatic extract were prepared as described above. The stability of the emulsions was judged by the tendency of the emulsions to separate into layers and the difficulty in mixing up the layers. The compositions were also diluted with water to form 1 percent solutions which were observed for stability. The appearance of the dilute solutions was found to be a good indication of the stability as there was a somewhat greater tendency toward settling of the larger particles and coalescence at the lower concentration.

The 0.25 part of saponified rosin compositions formed emulsions but in no case were the emulsions stable, whether in 50 percent or 1 percent concentration. The 0.4 part compositions, however, formed improved emulsions and the 0.66 part compositions formed very satisfactory emulsions.

Example II

Compositions containing 0.66 part of saponified rosin per part of oil were prepared as in Example I. The content of free rosin was varied to determine the influence of free rosin content, as measured by pH, on the stability of the emulsions. The average particle size of the emulsions was also determined as a measure of stability.

The emulsion made with extract A (50 percent emulsion) showed that a pH of 9.5 and 10.0, corresponding to a free rosin content of 8.5 and 5 percent, respectively, based on the original rosin, the emulsion did not separate. At a pH of 10.5, corresponding to a free rosin content of about 1 percent, the rate of separation was medium. At a pH of 11.0 the emulsion contains free alkali and the rate of separation was fast. At a pH of 9.5, 10.0 and 10.5 the average particle size in millimeters was 0.002, 0.004 and 0.008 respectively while at a pH of 11.0 the particle size increased to 0.040 and the emulsion coagulated rapidly. These results show that some free rosin must be present in the compositions to obtain emulsions of satisfactory stability and sizing efficiency.

Example III

Compositions containing 0.25 and 0.4 part of saponified rosin per part of aromatic extract in water were prepared as in Example I and tested for sizing efficiency in comparison to a rosin size.

In the determination of sizing efficiency of the compositions, the emulsion was used on unbleached kraft pulp. The pulp was first hydrated to a moderate extent by beating. The beaten pulp then was diluted to a concentration of 0.1 percent. 2.0 weight percent, based on the dry pulp, of the sizing emulsion of 1 percent concentration was added. After three minutes of beating with the sizing material, alum was added in an amount of 3 percent, based on the dry pulp. This was allowed to react for three minutes with continued beating and then hand sheets were formed over a perforated plate. The hand sheets were pressed between blotting paper and dried at a temperature of 100° C.

The tests used to determine the sizing efficiency of the compositions were as follows: (a) Floating disc: A sheet of sized paper 3" square was floated on a dilute solution of ammonium thiocyanate and the surface of the sheet was brushed with a solution of ferric chloride or sulfate. The first penetration gives an intense red color. The time required for the solution to penetrate the sized paper is measured; (b) inkspot area: A drop of ink (0.1 ml.) is placed on a sheet of sized paper and allowed to spread out and evaporate and the area of spreading is measured in square millimeters. The area of spreading is an indication of sizing efficiency; (c) indicator test: A sheet of sized paper is placed over some such dye as eosin or fluorescein. A drop of water (0.2 ml.) is put on the paper and the penetration wets the dye, forming a vivid spot of colour, especially observable under fluorescent light. The time required for the water to penetrate the sized paper is measured; (d) water absorption test: 0.2 ml. water is placed on a sheet of sized paper and the time required for complete absorption is measured. For unsized paper this is but a few seconds; and (e) ultra violet fluorescence: Since rosin size and rosin and extract size fluoresce under U. V. light, this method may be used to examine the evenness of the dispersion of sizing in the paper. This in turn is an indication of uniformity and stability of the emulsion during the sizing operation.

The results of the tests on the 0.4 part of saponified rosin compositions are tabulated below:

|  | Rosin | Extract A | Extract B | Extract C |
| --- | --- | --- | --- | --- |
| Weight Percent Size | 2.5 | 2.5 | 2.5 | 2.5 |
| Wt. of paper, lbs./ream | 89 | 82 | 82 | 79 |
| Paper thickness, in | 0.014 | 0.014 | 0.013 | 0.014 |
| U. V. flourescence, spots | None | few | few | few |
| Sizing efficacy [1]: |  |  |  |  |
| Absorption, min | 20 | 20 | 20 | 20 |
| Indicator, min | 51 | 51 | 48 | 15 |
| Floating disc, sec | 220 | 190 | 210 | 200 |
| Ink Spot, mm.$^2$ | 145 | 135 | 145 | 190 |

[1] Corrected to paper of 10 caliper mills.

The tests on the 0.25 part of saponified rosin compositions resulted in values far below that of the straight rosin size shown above, thus indicating that more than this amount of saponified rosin is required to prepare emulsions of satisfactory stability and sizing efficiency.

The results shown in the table above on the tests of the 0.4 part of saponified rosin compositions made with extracts A and B demonstrate that they are at least as efficient sizing materials as straight rosin size. Extracts A and B had aromaticities in terms of aniline point of below —6° C. and 57.7° C., respectively, while extract C had an aniline point of 65.4° C. The influence of aromaticity is shown by the results above in that the composition made with extract C of an aniline point of above about 60° C. was inferior to the straight rosin size and to the sizes made with extracts A and B. Therefore, for compositions of satisfactory sizing efficiency the aromatic extract must have an aniline point of not more than about 60° C.

The compositions of our invention thus provide excellent materials for the sizing of paper while utilizing a readily available and relatively inexpensive material to partially replace an expensive conventional sizing material such as rosin.

We claim:

1. A paper sizing composition which consists essentially of an aqueous emulsion of an aromatic petroleum lubricating oil extract having an aniline point of not more than about 60° C., an API gravity in the range of about 6.0 to 16.0, a flash point of not less than about 375° F., a viscosity in Saybolt Universal seconds in the range of about 400 to 35,000 at 100° F. and about 50 to 300 at 210° F. and a molecular weight in the range of about 250 to 500, and partially saponified rosin, in which composition the saponified rosin is in a ratio of about 0.4 to 3 parts per part of extract and in which free rosin is present in an amount of about 5 to 8.5 weight percent of the rosin present before saponification.

2. A paper sizing composition which consists essentially of an aqueous emulsion of an aromatic petroleum lubricating oil extract having an aniline point of not more than about 60° C., an API gravity in the range of about 6.0 to 16.0, a flash point of not less than about 375° F., a viscosity in Saybolt Universal seconds in the range of about 400 to 35,000 at 100° F. and about 50 to 300 at 210° F. and a molecular weight in the range of about 250 to 500, and partially saponified rosin, in which composition the saponified rosin is in a ratio of about 1 to 3 parts per part of extract and in which free rosin is present in an amount of about 6.5 to 8.5 weight percent of the rosin present before saponification.

3. A paper sizing composition for use in forming water emulsions which consists essentially of a mixture of an aromatic petroleum lubricating oil extract having an aniline point of not more than about 60° C., an API gravity in the range of about 6.0 to 16.0, a flash point of not less than about 375° F., a viscosity in Saybolt Universal seconds in the range of about 400 to 35,000 at 100° F. and about 50 to 300 at 210° F. and a molecular weight in the range of about 250 to 500, and partially saponified rosin, in which composition the saponified rosin is in a ratio of about 0.4 to 3 parts per part of extract and in which free rosin is present in an amount of about 5 to 8.5 weight percent of the rosin present before saponification.

4. A paper sizing composition for use in forming water emulsions which consist essentially of a mixture of an aromatic petroleum lubricating oil extract having an aniline point of not more than about 60° C., an API gravity in the range of about 6.0 to 16.0, a flash point of not less than about 375° F., a viscosity in Saybolt Universal seconds in the range of about 400 to 35,000 at 100° F. and about 50 to 300 at 210° F. and a molecular weight in the range of about 250 to 500, and partially saponified rosin, in which composition the saponified rosin is in a ratio of about 1 to 3 parts per part of extract and in which free rosin is present in an amount of about 6.5 to 8.5 weight percent of the rosin present before saponification.

References Cited in the file of this patent

UNITED STATES PATENTS

| | | |
|---|---|---|
| 701,125 | Arledter | May 27, 1902 |
| 1,672,377 | Exley | June 5, 1928 |
| 2,258,390 | Martin | Oct. 7, 1941 |
| 2,426,277 | Miller | Aug. 26, 1947 |
| 2,460,787 | Seedford | Feb. 1, 1949 |
| 2,695,865 | Mills | Nov. 30, 1954 |

FOREIGN PATENTS

| | | |
|---|---|---|
| 902,441 | France | Aug. 30, 1945 |